(12) United States Patent  
Kusama et al.

(10) Patent No.: US 7,185,164 B2  
(45) Date of Patent: Feb. 27, 2007

(54) METHOD FOR REARRANGING LOGICAL VOLUME

(75) Inventors: Takato Kusama, Yokohama (JP); Tatsundo Aoshima, Sagamihara (JP); Kei Takeda, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 305 days.

(21) Appl. No.: 10/834,839

(22) Filed: Apr. 30, 2004

(65) Prior Publication Data

US 2005/0229032 A1 Oct. 13, 2005

(30) Foreign Application Priority Data

Feb. 19, 2004 (JP) ............... 2004-042218

(51) Int. Cl.
G06F 12/02 (2006.01)
G06F 11/10 (2006.01)

(52) U.S. Cl. .............. 711/170; 710/10; 710/8; 714/6

(58) Field of Classification Search ............ None
See application file for complete search history.

(56) References Cited

U.S. PATENT DOCUMENTS

| | | | | |
|---|---|---|---|---|
| 5,905,995 | A * | 5/1999 | Tabuchi et al. ............. | 711/114 |
| 5,956,750 | A * | 9/1999 | Yamamoto et al. ......... | 711/167 |
| 6,122,685 | A * | 9/2000 | Bachmat ..................... | 710/74 |
| 6,446,161 | B1 | 9/2002 | Yamamoto et al. | |
| 6,766,416 | B2 | 7/2004 | Bachmat | |
| 6,889,304 | B2 * | 5/2005 | Perego et al. ............... | 711/170 |
| 6,895,483 | B2 | 5/2005 | Eguchi et al. | |
| 7,047,360 | B2 * | 5/2006 | Soejima et al. ............. | 711/114 |
| 2004/0123029 | A1 | 6/2004 | Dalal et al. | |
| 2005/0050270 | A1 | 3/2005 | Horn et al. | |
| 2005/0154821 | A1 | 7/2005 | Furuhashi et al. | |

OTHER PUBLICATIONS

K. Mogi and M. Kitsuregawa, "Performance Evaluation Of Hot Mirrored Disk Arrays On Disk Failure", Technical Report of IEICE, CPSV95-82, DE95-68 (Dec. 1995), vol. 95-No. 407, pp. 19-24.

* cited by examiner

Primary Examiner—B. James Peikari
(74) Attorney, Agent, or Firm—Mattingly, Stanger, Malur & Brundidge, P.C.

(57) ABSTRACT

A method for rearranging a logical volume including arranging a logical volume rearranging program on a particular server and using the logical volume rearranging program to acquire server/storage mapping information from each server and performance information from each storage subsystem. Moreover, the logical volume rearranging program acquires request I/O performance and a rearranging rule for each application set by a user. Furthermore, the logical volume rearranging program determines a destination by using the logical volume rearranging destination parity group specified by the user according to the aforementioned information, and rearranges the logical volume according to the storage subsystem performance and the request I/O performance of each application.

18 Claims, 13 Drawing Sheets

FIG.5

0500 SERVER/STORAGE MAPPING TABLE

| SERVER | VOLUME | CONNECTION DESTINATION STORAGE | CONNECTION DESTINATION LOGICAL VOLUME | CONNECTION DESTINATION PARITY GROUP |
|---|---|---|---|---|
| SERVER A | VOLUME A | STORAGE A | LOGICAL VOLUME A | PARITY GROUP A |
| SERVER A | VOLUME B | STORAGE A | LOGICAL VOLUME B | PARITY GROUP A |
| SERVER B | VOLUME C | STORAGE A | LOGICAL VOLUME A | PARITY GROUP B |
| SERVER B | VOLUME D | STORAGE A | LOGICAL VOLUME B | PARITY GROUP C |
|  |  |  |  |  |

0510 LOGICAL VOLUME PERFORMANCE INFORMATION TABLE

| STORAGE | LOGICAL VOLUME | USE RATIO |
|---|---|---|
| STORAGE A | LOGICAL VOLUME A | 25% |
| STORAGE A | LOGICAL VOLUME B | 29% |
| STORAGE A | LOGICAL VOLUME C | 30% |
| STORAGE B | LOGICAL VOLUME C | 49% |
|  |  |  |

PARITY GROUP PERFORMANCE INFORMATION TABLE 0520

| STORAGE 0521 | PARITY GROUP 0522 | USE RATIO 0523 |
|---|---|---|
| STORAGE A | PARITY GROUP A | 67% |
| STORAGE A | PARITY GROUP B | 34% |
| STORAGE A | PARITY GROUP C | 47% |
| STORAGE A | PARITY GROUP D | 42% |
|  |  |  |

FIG.8

REQUEST I/O PERFORMANCE SETTING INFORMATION TABLE 0530

| SERVER 0531 | RESOURCE 0532 | REQUEST I/O PERFORMANCE 0533 |
|---|---|---|
| SERVER A | VOLUME A | HIGH |
| SERVER A | VOLUME B | INTERMEDIATE |
| SERVER A | VOLUME C | LOW |
| SERVER B | VOLUME C | INTERMEDIATE |
|  |  |  |

FIG.9

SEARCH CONDITION INFORMATION TABLE (0540)

| SEARCH CONDITION NAME (0541) | PRIORITY ORDER (0542) | PRIORITY ITEM (0543) |
|---|---|---|
| POLICY A | 1 | THE NUMBER OF DETERIORATION JOB AP (REQUEST I/O PERFORMANCE: INTERMEDIATE) |
| POLICY B | 2 | PARITY GROUP PERFORMANCE |
| POLICY C | 3 | THE NUMBER OF DETERIORATION JOB AP (REQUEST I/O PERFORMANCE: HIGH) |
| POLICY D | 4 | THE NUMBER OF DETERIORATION JOB AP (AS A WHOLE) |
| | | |

FIG.10

SEARCH INFORMATION TABLE (0550)

| SEARCH CONDITION NAME (0551) | SEARCH ITEM (0552) | OPERATOR (0553) | SETTING VALUE (0554) |
|---|---|---|---|
| POLICY A | PARITY GROUP PERFORMANCE | < | 70% |
| POLICY A | THE NUMBER OF DETERIORATION JOB AP (REQUEST I/O PERFORMANCE: HIGH) | == | 0 |
| POLICY B | THE NUMBER OF DETERIORATION JOB AP (REQUEST I/O PERFORMANCE: INTERMEDIATE) | <= | 5 |
| POLICY C | PARITY GROUP PERFORMANCE | < | 80% |
| | | | |

FIG.19

APPLICATION MAPPING TABLE — 0560

| APPLICATION (0561) | SERVER (0562) | VOLUME (0563) |
|---|---|---|
| JOB A | SERVER A | VOLUME A |
| JOB A | SERVER A | VOLUME B |
| JOB B | SERVER B | VOLUME A |
| JOB C | SERVER C | VOLUME A |
| | | |

METHOD FOR REARRANGING LOGICAL VOLUME

CROSS-REFERENCE TO RELATED APPLICATION

This application relates to Japanese Patent Application No. 2004-042218 filed on Feb. 19, 2004, the entire disclosure of which is incorporated herein by reference.

BACKGROUND OF THE INVENTION

The present invention relates to a storage system via a network in an environment having one or more servers and storage sub systems and in particular, to a method for rearranging a logical volume.

As a storage capacity of each enterprise increases, attention is given to a technique for reducing the storage management cost. For example, by using a SAN (Storage Area Network) and a NAS (Network Attached Storage), it is possible to share a single storage device by a plurality of Application Servers, thereby localizing a storage operation job. As a result, it is possible to reduce the storage operation management cost.

In such an environment, since a single storage device is shared by a plurality of Application Servers, I/O from the servers are concentrated in the single storage device. In the SAN or NAS environment, a disc array system (storage subsystem) may be used for realizing a high-speed I/O. As the technique for realizing the high-speed I/O in the disc array system, there is RAID (Redundant Array of Inexpensive Disks). The RAID manages a plurality of discs as a single set, and operates the discs in parallel for realizing high-speed I/O. Here, this disc set will be referred to as a parity group. Moreover, in general, the parity group is divided into a plurality of volumes and each volume is allocated to a plurality of servers. Here, the volume will be referred to as a logical volume.

Thus, in the SAN and the NAS environment, when logical volumes in the parity group are allocated to a plurality of servers, a plurality of servers may share the same parity group. If I/O is concentrated in a particular parity group, the I/O of the server using the parity group is deteriorated.

Conventionally, as is disclosed in U.S. Pat. No. 6,446,161, the I/O load between the parity groups has been balanced by moving the logical volume from the parity group where I/O is concentrated to another parity group where I/O is not concentrated according to the performance information of each parity group. Here, the movement of the logical volume for balancing the I/O load between the parity groups will be referred to as rearrangement of the logical volume.

It should be noted that the I/O performance is changed by a cache. Here, however, for clarification, no mention is made for the performance change by the cache.

In general, the I/O performance required by an application using a storage sub system greatly differs according to the application processing content. For example, for a server executing a transaction processing, when the response time of each transaction is 0.5 seconds or less, the average number of accesses to the storage device per one transaction is two, and 100 transactions should be processed in one second, a high-speed I/O performance is required. On the other hand, backup processing and application such as a batch processing at night do not require a high-speed I/O performance in many cases.

Thus, the I/O performance required by the application differs according to the processing content and accordingly, in rearranging the logical volume, the I/O performance required by each application should be taken into consideration. That is, in rearrangement of the logical volume, the movement destination is not decided only from the viewpoint of balancing of the I/O load between the parity groups. When the I/O load of the parity group of the movement destination is increased by the rearrangement of the logical volume, it should also be considered whether the performance of the parity group of the movement destination can satisfy the I/O performance required by each application. Thus, the movement destination should be decided.

However, in the conventional method, the movement destination parity group is decided only according to the storage performance and no consideration is given to the I/O performance required by the application using the movement destination parity group. Therefore, in the conventional method, the parity group connected by the application requiring a high-speed performance may be selected as a movement destination. As a result, the requirement value of the I/O performance of the application cannot be satisfied and the rearrangement of the logical volume may cause a performance problem. As a result, it becomes impossible to satisfy the requirement value of the I/O performance of the application and there arises a performance problem by the rearrangement of the logical volume.

SUMMARY OF THE INVENTION

It is therefore an object of the present invention to provide a method for rearranging a logical volume considering the affect range to the application by the rearrangement of the logical volume.

According to the present invention, a logical volume rearranging program is arranged in a particular server. The logical volume rearranging program acquires server storage mapping information from each server and performance information from each storage subsystem. Moreover, the logical volume rearranging program acquires the required I/O performance and rearranging rule for each application set by a user. Furthermore, according to the aforementioned information, the logical volume rearranging program decides the rearranging destination of the logical volume.

With this configuration, it is possible to rearrange the logical volume according to the storage sub system performance and required I/O performance of each application.

Other objects, features and advantages of the invention will become apparent from the following description of the embodiments of the invention taken in conjunction with the accompanying drawings.

BRIEF DESCRIPTION OF THE DRAWINGS

FIG. 5 shows an example of a server/storage mapping table in the present embodiment.

FIG. 6 shows an example of a logical volume performance information table in the present embodiment.

FIG. 7 shows an example of a parity group performance information table in the present embodiment.

FIG. 8 shows an example of required I/O performance setting information table in the present embodiment.

FIG. 9 shows an example of a search condition information table in the present embodiment.

FIG. 10 shows an example of a search equation information table in the present embodiment.

FIG. 19 shows an example of application mapping table in the present embodiment.

DETAILED DESCRIPTION OF THE EMBODIMENTS

The examples of the storage management systems according to the embodiments are simplified by omitting explanation of functions not necessary for explanation of the present invention, but the scope of the invention is not limited to the simplified examples.

Hereinafter, explanation will be given regarding the first embodiment of the present invention. It should be noted that in the first embodiment, when a request I/O performance and a rearranging rule are set for a server volume, the logical volume is rearranged according to the set information and the storage performance information.

Figure 2:
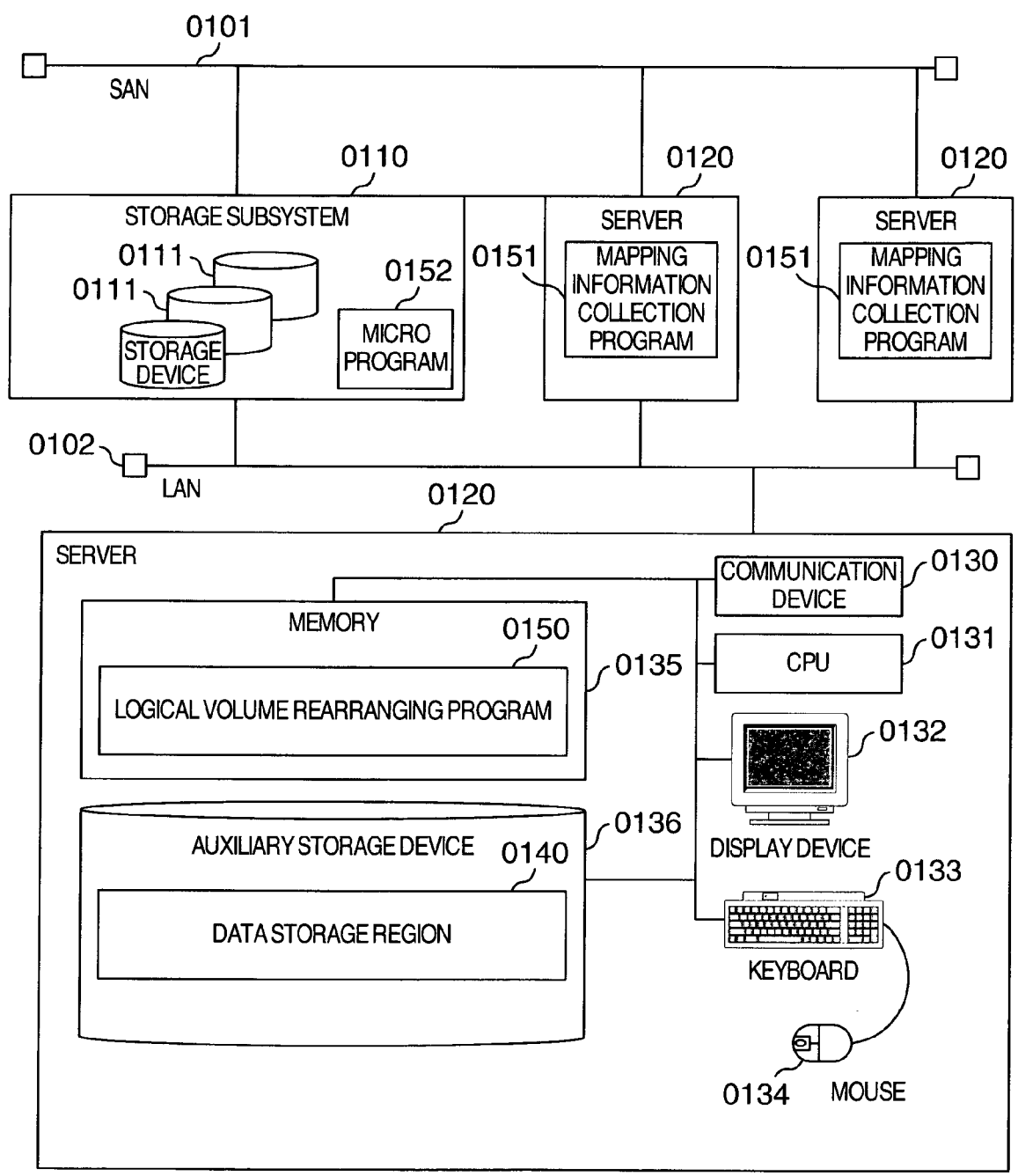
FIG. 2 shows an example of a configuration of a SAN system in the present embodiment.

FIG. 2 shows a system configuration of the embodiment. This system includes a plurality of storage subsystems 0110, a plurality of servers 0120, SAN 0101 and LAN 0102 for connecting the storage subsystems 0110 to the servers 0120. The storage subsystems 0110 have a plurality of storage devices 0111 and a micro program 0152. The micro program 0152 includes a function for forming a parity group having a specified RAID level from the plurality of storage devices 0111 and a function for creating a volume having a specified capacity from the parity group. It should be noted that hereinafter, the volume in the storage subsystem will be referred to as a logical volume. Moreover, the micro program 0152 has a function for acquiring performance information on each logical volume and performance information on each parity group and a function for moving the logical volume to another parity group.

The server 0120 in this embodiment includes a communication device 0130, a CPU 0131, a display device 0132, a keyboard 0133, a mouse 0134, a memory 0135, and an auxiliary storage device 0136. Each server 0120 executes a mapping information collection program 0151. The mapping information collection program 0151 will be detailed later. Furthermore, a particular server 0120 executes a logical volume rearranging program 0150. Each program is stored in the logical volume allocated to the server 0120 as program data or in the auxiliary storage device 0136. Moreover, upon execution, each engine is read into a main memory 0135 and executed by the CPU 0131. A data storage region 0140 retains information necessary for executing the logical volume rearranging program 0150.

Next, explanation will be given regarding the mapping information collecting program 0151, the logical volume rearranging program 0150, and the data storage region 0140 in the present embodiment.

Figure 1:
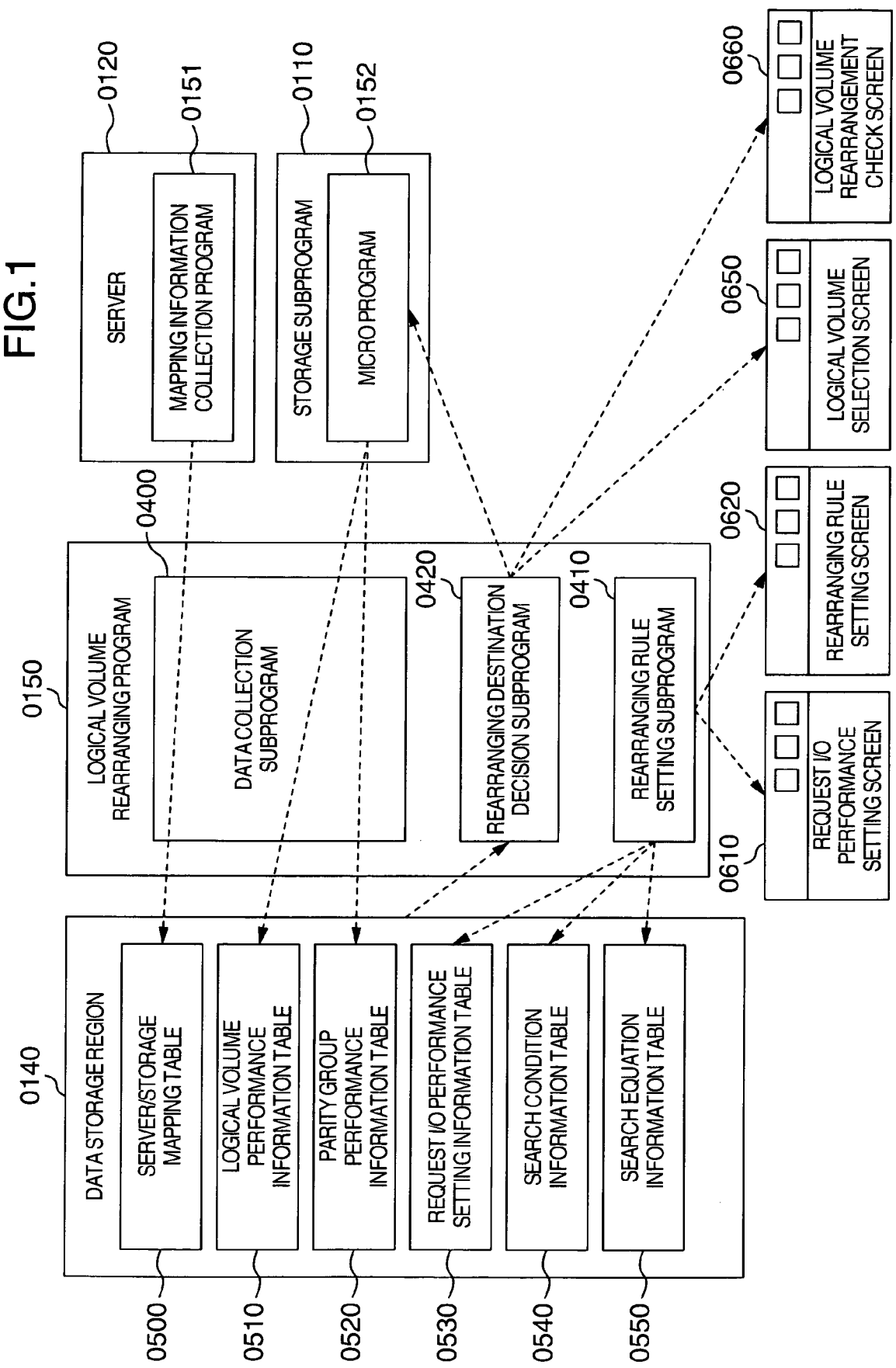
FIG. 1 shows a relationship between a data storage region, a logical volume rearranging program, a server, a storage sub system, and each screen in the first embodiment.

As shown in FIG. 1, the data storage region 0140 includes a server storage mapping table 0500, a logical volume performance information table 0510, a parity group performance information table 0520, a request I/O performance setting information table 0530, a search condition information table 0540, and a search equation information table 0550. The server storage mapping table 0500 is a table retaining the correspondence relationship between the volume used by the server 0120 and the logical volume in the storage subsystem 0110. The logical volume performance information table 0510 and the parity group performance information table 0520 are tables for storing the performance information of the logical volume and the parity group in the storage subsystem 0110. Moreover, the request I/O performance setting information table 0530 is a table for retaining a request I/O performance set for each volume in the server. Furthermore, the search condition information table 0540 and the search equation information table 0550 are tables for retaining the rearranging rule to be set by an administrator. It should be noted that each table will be detailed later.

The mapping information collecting program 0151 is a program for acquiring a parity group as a logical volume, which connects to the volume on the server 0120, in the storage subsystem 0110.

Moreover, as shown in FIG. 1, the logical volume rearranging program 0150 in the present embodiment includes a data collection subprogram 0400, a rearranging rule setting subprogram 0410, and a rearranging destination decision program 0420.

The data collection subprogram 0400 acquires mapping information regarding the volume in the server 0120 and the parity group that connects to the volume from the mapping information collection program 0151 and stores the mapping information in the server storage mapping table. Furthermore, the data collection subprogram 0400 acquires performance information on the logical volume and the parity group from the micro program 0152 in the storage subsystem 0110 and stores the performance information in the logical volume performance information table 0510 and in the parity group performance information table 0520.

The rearranging rule setting program 0410 displays a request I/O performance setting screen 0610 for setting the request I/O performance for each volume and a rearranging rule setting screen 0620 for setting the rearranging rule, and stores the values set by an administrator in the request I/O performance setting information table 0530, the search condition information table 0540, and the search equation information table 0550.

The rearranging destination decision subprogram 0420 firstly displays a logical volume selection screen 0650 for specifying a logical volume to be moved. Moreover, the rearranging destination decision subprogram 0420 decides the movement destination parity group of the logical volume specified by the aforementioned screen according to the data retained in the data storage region 0140 and displays the movement destination parity group in the logical volume rearrangement check screen 0660. Furthermore, the rearranging destination decision subprogram 0420 executes an instruction to move the logical volume to the parity group for the micro program 0152 in the storage subsystem 0110.

Figure 3:
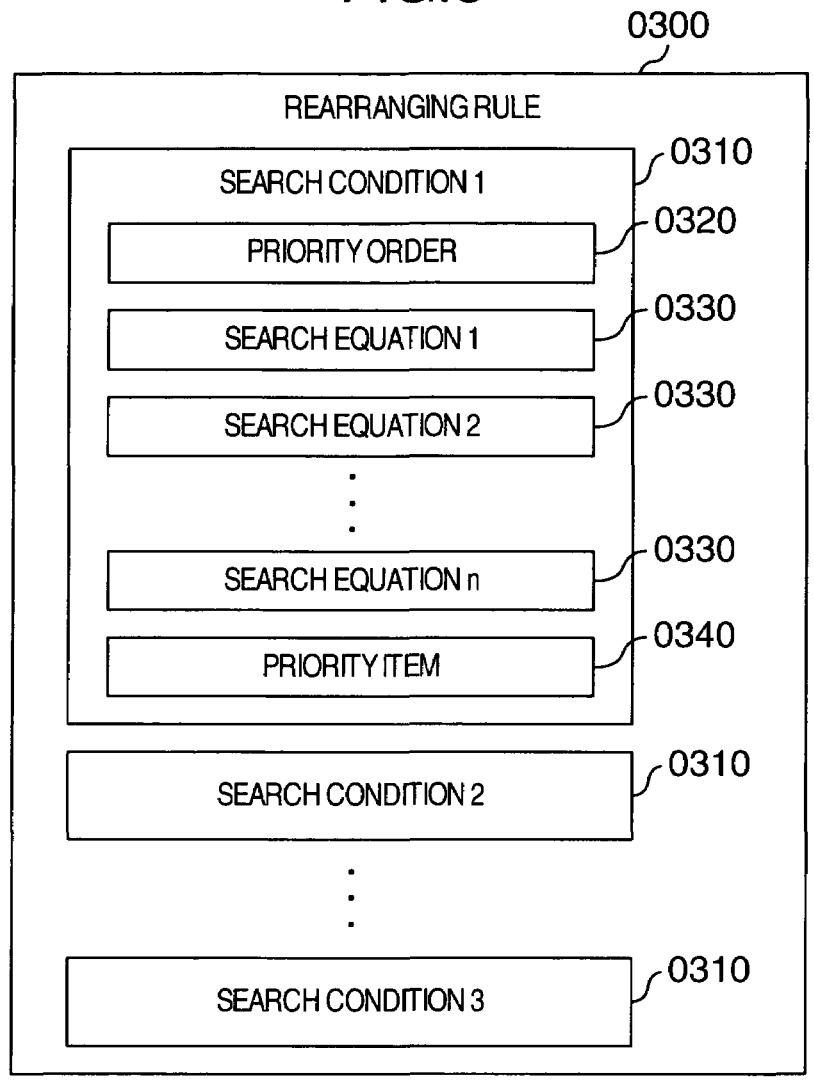
FIG. 3 shows an example of a configuration of the rearrangement rule in the present embodiment.

It should be noted that the rearranging rule in this embodiment is setting information used when the rearranging destination deciding subprogram decides the movement destination parity group. FIG. 3 shows a configuration of the rearranging rule in this embodiment.

The rearrangement rule 0300 consists of a plurality of search conditions 0310. Each of the search conditions 0310 has a priority order 0320, a plurality of search equations 0330, and a priority item 0340.

The rearrangement destination decision subprogram 0420 decides the movement destination parity group by using the search condition 0310 having a high priority order according to the priority order 0320 of the search condition 0310. Moreover, the rearrangement destination decision subprogram 0420 selects one parity group satisfying the search condition 0310 by using the search condition 0310 as follows. Firstly, the subprogram searches a parity group satisfying all the search equation 0330 constituting the search condition 0310. Next, when there are a plurality of the parity groups satisfying the aforementioned condition, one of the parity groups is selected according to the priority item 0340. More specifically, a processing flow will be detailed later.

It should be noted that in the search equation 0330 of the present embodiment, it is possible to specify "the parity group performance" after movement, "the number of I/O performance deterioration resources", "the number of I/O performance deterioration resources (request I/O performance: high)", "the number of I/O performance deterioration resources (request I/O performance: intermediate)", and "the number of I/O performance deterioration resources (request I/O performance; low)". Moreover, in the priority item 0340 of the present embodiment, it is possible to specify the item explained before. It should be noted that in the first embodiment, the number of volumes whose I/O performance is deteriorated by the logical volume rearrangement is referred to as "the number of I/O performance deterioration resources." The number of volumes whose I/O performance is deteriorated by the logical volume rearrangement with a high request I/O performance is referred to as "the number of I/O performance deterioration resources (request I/O performance: high)". The number of volumes whose I/O performance is deteriorated by the logical volume rearrangement with an intermediate request I/O performance is referred to as "the number of I/O performance deterioration resources (request I/O performance: intermediate)". The number of volumes whose I/O performance is deteriorated by the logical volume rearrangement with a low request I/O performance is referred to as "the number of I/O performance deterioration resources (request I/O performance: low)".

Thus, the number of volumes whose I/O performance is deteriorated by the logical volume rearrangement can be specified in the condition equation and accordingly, it is possible to reduce the number of volumes whose I/O performance is deteriorated by the logical volume rearrangement.

Moreover, among volumes having a particular request I/O performance, it is possible to specify, in the condition equation, the number of volumes whose I/O performance is deteriorated by the logical volume rearrangement and accordingly, it is possible to rearrange logical volumes without affecting the I/O performance of the logical volume which always requires a high-speed I/O performance.

Furthermore, in addition to the number of volumes whose I/O performance is affected, it is possible to include the parity group performance information in the condition equation and accordingly it is possible to effectively use the resources by flexibly setting the rearrangement rule. For example, if a parity group having an extremely small I/O load is present, the parity group is used because it is possible almost to ignore the performance deterioration by the logical volume movement. Otherwise, the logical volume rearrangement destination is decided according to the request I/O performance of each volume.

Next, each program will be detailed.

Firstly, explanation will be given on the mapping information collection program 0151. It should be noted that this program may be installed directly into each server 0120 by the administrator or provided as a part of the OS function.

The mapping information collection program 0151 collects mapping information from the volume of the server 0120 and the logical volume in the storage subsystem 0110 allocated for that volume. In order to collect the information, the mapping information collection program 0151 executes a SCSI inquiry command for each volume on the server 0120. The command can be executed for each volume from the server.

Figure 4:
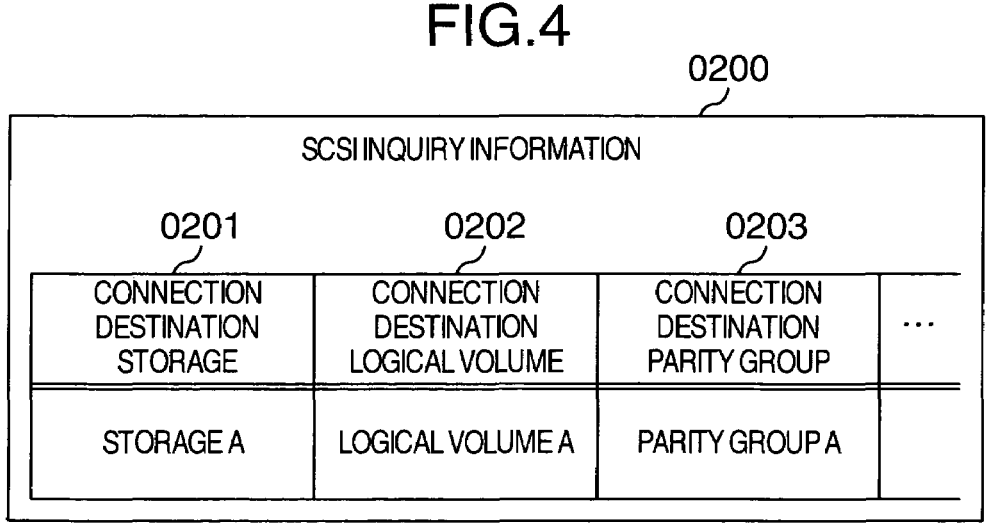
FIG. 4 shows an example of SCSI inquiry information in the present embodiment.

The command issued is transmitted via the SAN 0101 to the storage subsystem 0110. The storage subsystem 0110 returns the execution result of the command. In this embodiment, as the execution result of the command, SCSI inquiry information 0200 is returned. FIG. 4 shows the SCSI inquiry information 0200 in this embodiment. The SCSI inquiry information 0200 holds the name of storage connecting to the volume, the name of logical volume connecting to the volume, and the name of parity group connecting to the volume in the connection destination storage column 0201, the connection destination logical volume column 0202, and the connection destination parity group column 0203.

Moreover, in the SCSI inquiry information 0200, the connection destination logical volume and the connection destination parity group are acquired by using the SCSI inquiry command. However, it is also possible to use only the connection destination logical volume in the command and acquire the information on the parity group containing the logical volume from the micro program 0152 of the storage subsystem 0110.

Moreover, explanation will be given on each subprogram constituting the logical volume rearrangement program 0150.

(1) Data Collection Subprogram 0400

Firstly, before starting an explanation regarding the data collection subprogram 0400, explanation will be given regarding the server storage mapping table 0500, the logical volume performance information table 0510, and the parity group performance information table 0520.

The server storage mapping table 0500 is a table indicating mapping information between each volume in the server 0120 and the storage subsystem 0110, and a record is present for each volume. FIG. 5 shows an example of the table in this embodiment. This table has a server name to which the volume belongs and a volume name in the columns of the server 0501 and the volume 0502. Moreover, this table has the connection destination storage subsystem name, the connection destination logical volume name, and the connection destination parity group name in the columns of the connection destination storage 0503, the connection destination logical volume 0504, and the connection destination parity group 0505, respectively.

The logical volume performance information table 0510 is a table indicating I/O performance information on each logical volume in the storage subsystem 0110. FIG. 6 shows an example of the table in this embodiment. This table has the storage subsystem name to which the logical volume belongs, the logical volume name, and the logical volume performance information in the columns of the storage 0511, the logical volume 0512, and the use ratio 0513, respectively.

The parity group performance information table 0520 is a table indicating I/O performance information on each parity group in the storage subsystem 0110. FIG. 7 shows an example of the table in this embodiment. This table has the storage subsystem name to which the parity group belongs, the parity group name, and the parity group performance information in the columns of the storage 0521, the parity group 0522, and the use ratio 0523, respectively.

Next, an explanation will be given regarding the data collection subprogram 0400.

As shown in FIG. 1, the data collection subprogram 0400 collects SCSI inquiry information 0200 for each volume from the mapping information collection program 0151 in each server 0120 and registers it in the server/storage mapping table 0500. More specifically, the server name and the volume name from which data is acquired, the volume connection destination storage 0201, the connection destination logical volume 0202, and the connection destination parity group 0203 are stored in the server 0501, the volume 0502, the connection destination storage 0503, the connection destination logical volume 0504, and the connection destination parity group 0505, respectively.

Moreover, the logical volume and the parity group performance information acquired from the micro program 0152 in each storage subsystem 0110 are stored in the logical volume performance information table 0510 and the parity group performance information table 0520. More specifically, the storage name and the logical volume from which data is acquired and the use ratio of the logical volume are stored in the storage 0511, the logical volume 0512, and the use ratio 0513, respectively. Furthermore, the storage name and the parity group name from which data is acquired and the use ratio of the parity group are stored in the storage 0521, the parity group 0522, and the use ratio 0523, respectively.

It should be noted that in this embodiment, the use ratio is acquired as storage performance information. However, instead of the use ratio, it is possible to use the transmission data amount, the number of I/O instruction occurrences, the number of random accesses, the number of sequential accesses, and the like. This information can be acquired by the method disclosed in U.S. Pat. No. 6,446,161 and the like.

(2) Rearranging Rule Setting Subprogram

Next, before starting an explanation regarding the rearranging rule setting subprogram 0410, explanation will be given regarding the request I/O performance setting information table 0530, the search condition information table 0540, and the search equation information table 0550.

FIG. 8 shows the request I/O performance setting information table 0530 in the present embodiment. As shown in FIG. 8, this table has columns of the server 0531, the resource 0532, and the request I/O performance 0533.

FIG. 9 shows the search condition information table 0540 in the present embodiment. As shown in FIG. 9, this table is a table retaining setting information on the search condition 0310. More specifically, the name set for the search condition 0310, the priority order 0320, and the priority item 0340 are stored in the columns of the search condition name 0541, the priority order 0542, and the priority item 0543, respectively.

FIG. 10 shows the search equation information table 0550 in the present embodiment. As shown in FIG. 10, this table is a table retaining setting information on the search equation 0330. More specifically, this table has the name of the search condition 0310 to which the search equation 0330 belongs, the left side of the search equation 0330, the operator, and the right side in the columns of the search condition name 0551, the search item 0552, the operator 0553, and the setting value 0554, respectively.

Next, an explanation will be given regarding the request I/O performance setting screen 0610 and the rearranging rule setting screen 0620 displayed by the rearranging rule setting subprogram 0410.

The request I/O performance setting screen 0610 is a screen for setting the request I/O performance for each volume. It should be noted that in this embodiment, for simplification of explanation, the request I/O performance is divided into three states of high, intermediate and low. However, the request I/O performance may be set, for example, by using integer values (for example, from 0 to 100).

Figure 11:
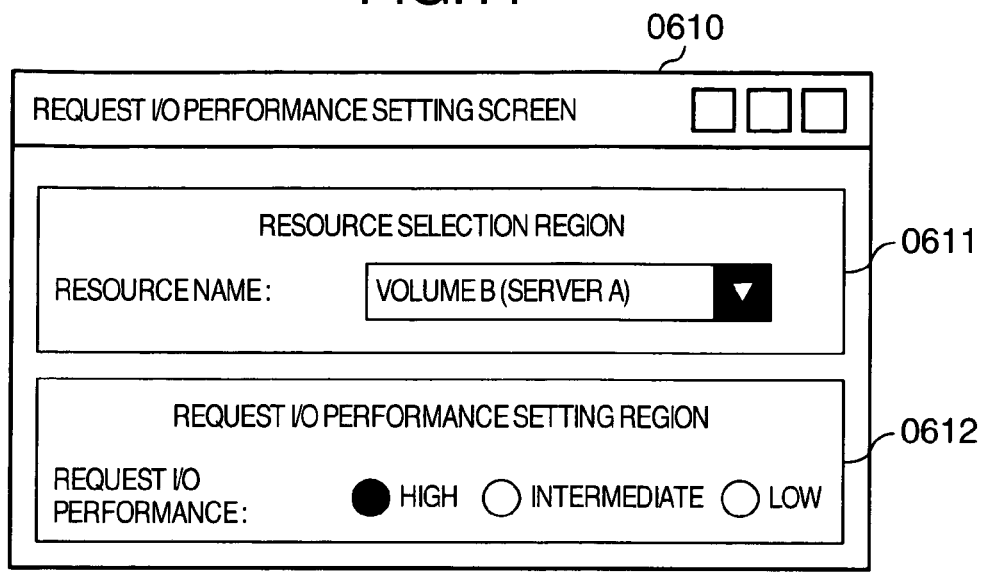
FIG. 11 shows an example of a required I/O performance setting screen in the present embodiment.

FIG. 11 shows the request I/O performance setting screen in this embodiment. This screen consists of a resource selection region 0611 and a request I/O performance setting region 0612. The resource selection region 0611 is a region for selecting one volume by the administrator. Moreover, the request I/O performance setting region 0612 is a region for specifying the request I/O performance for the volume selected in the resource selection region 0611.

Figure 12:
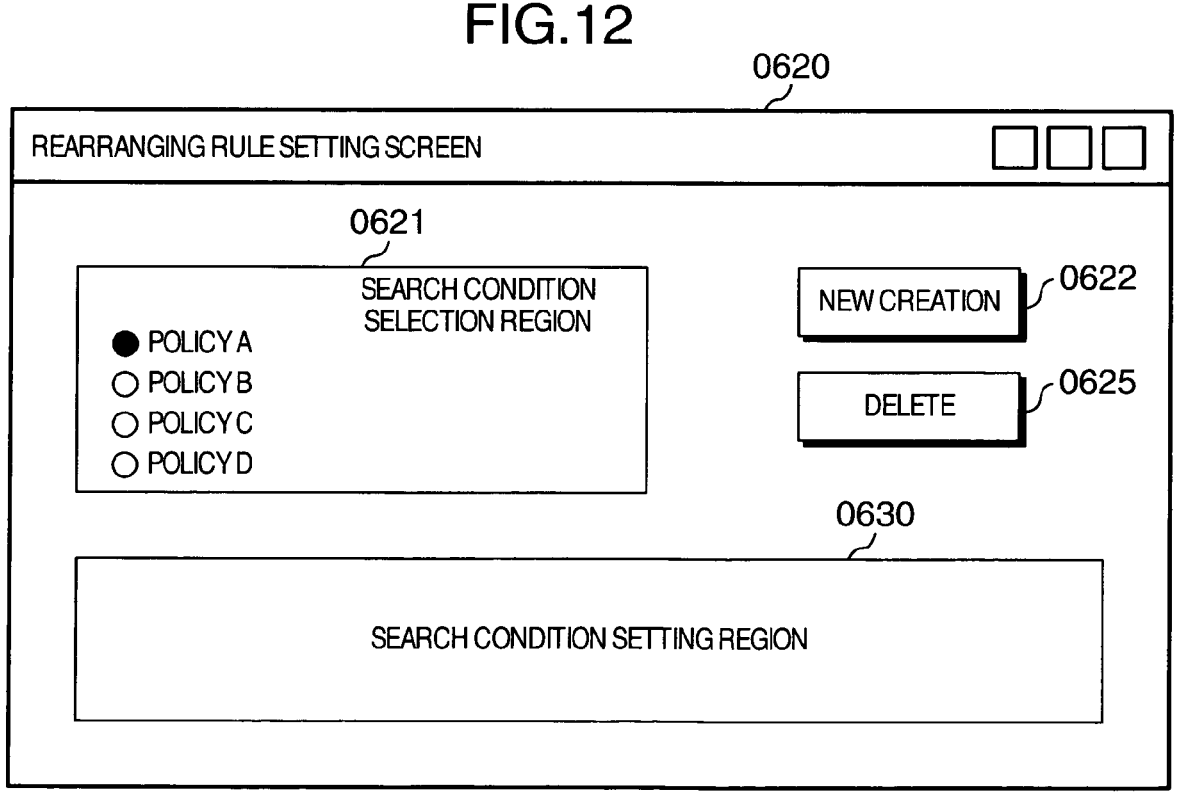
FIG. 12 shows an example of a rearrangement rule setting screen in the present embodiment.

The rearranging rule setting screen 0620 is a screen for setting the rearranging rule. FIG. 12 shows the screen in this embodiment. As shown in FIG. 12, this screen consists of a search condition selection region 0621, a new creation button 0622, a delete button 0625, and a search condition setting region 0630.

The search condition selection region 0621 is a region for selecting the search condition 0310. When the search condition 0310 is selected by the search condition selection region 0621, various conditions of the search condition selected by the search condition setting region 0630 are displayed. The new creation button 0622 is a region for creating a new search condition 0310. When the new creation button 0622 is pressed, the setting items for setting the search condition 0310 are displayed in the search condition setting region. The delete button 0625 is a button for deleting the search condition 0310 selected in the search condition selection region 0621. The search condition setting region 0630 is a region for displaying and setting detailed definition information on the search condition 0310 selected in the search condition selection region 0621.

Figure 13:
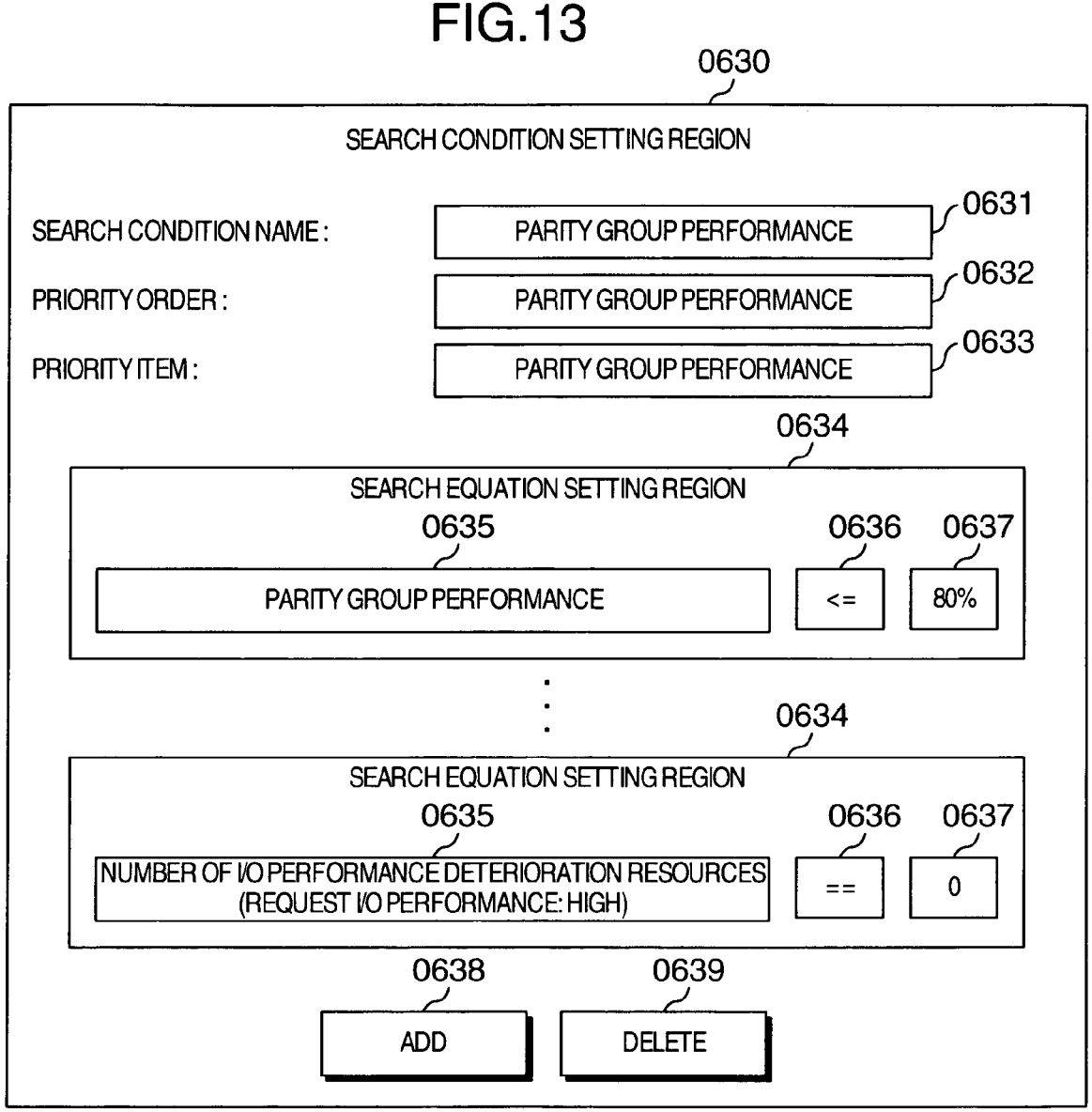
FIG. 13 shows an example of a search condition setting region in the present embodiment.

Next, FIG. 13 shows the search condition setting region 0630 in the present embodiment.

The search condition name input area 0631 is a region for inputting the name of the search condition 0310. The priority order input region 0632 is a region for inputting the priority order 0320 of the search condition 0310. The priority item input region 0633 is a region for inputting the priority item 0340 of the search condition 0310. The search equation setting region 0634 is a region for setting the search equation 0330 and consists of a left side value input region 0635, an operator input region 0636, and a right side value input region 0637. The left side value input region 0635, the operator input region 0636, and the right side value input region 0637 are regions for inputting the left side value, the operator, and the right side value of the search equation 0330. The addition button 0638 is a button for adding the search equation setting region 0634 to the search condition setting region 0630. The delete button 0639 is a button for deleting the search equation setting region 0634 selected in the search condition setting region 0630.

It should be noted that in this embodiment, as the priority item input region 0633 and the left side value input region 0635, it is possible to set the "parity group performance", "the number of I/O performance deterioration resources", "the number of I/O performance deterioration resources (request I/O performance: high)", "the number of I/O performance deterioration resources (request I/O performance: intermediate)", and "the number of I/O performance deterioration resources (request I/O performance: low)".

Lastly, the rearranging rule setting subprogram 0410 will be detailed.

The rearranging rule setting subprogram 0410 firstly displays the request I/O performance setting screen 0610 and stores the information set by the request I/O performance setting region 0612 in the screen, in the request I/O performance setting definition table 0530. More specifically, the rearranging rule setting subprogram 0410 displays all the volumes contained in the server/storage mapping table in the resource selection region 0611. Moreover, when the request I/O performance is set by the request I/O performance setting region 0612, the aforementioned subprogram stores the server name of the volume selected by the resource selection region 0611, the volume name, and the request I/O performance which has been set in the server 0531, the resource 0532, and the request I/O performance 0533 of the request I/O performance setting information table 0530.

Moreover, the rearranging rule setting subprogram 0410 displays the rearranging rule setting screen 0620 and stores the search condition set in the aforementioned screen in the search condition information table 0540 and the search equation information table 0550. More specifically, the rearranging rule setting subprogram 0410 displays all the search condition name registered in the search condition information table 0540 in the search condition selection region 0621. Moreover, when the search condition displayed in the search condition region 0621 is selected, the aforementioned subprogram displays the search condition name 0541, the priority order 0542, and the priority item 0543 in the search condition name input region 0631, the priority order input region 0632 and the priority item input region 0633 as the information on the search condition in the search condition setting region. Moreover, the search equation contained in the search condition is searched by using the search condition name 0551 as the key and the search equation setting region 0634 is displayed. In the search equation setting region 0634, the search item 0552, the operator 0553, and the setting value 0554 are displayed in the left side value input region 0635, the operator input region 0636, and the right side value input region 0637. Moreover, when the value displayed is modified, the value in the column of the corresponding table is modified.

Furthermore, when the new creation button 0622 is pressed, the rearranging rule setting subprogram 0410 adds a new record to the search condition information table 0540. Moreover, in the search condition setting region, a screen is displayed for setting the new search condition added. More specifically, a blank is displayed in the search condition name input region 0631, the priority order input region 0632, and the priority item input region 0633. Moreover, when the delete button 0625 is pressed, the rearranging rule setting subprogram 0410 deletes the record concerning the search condition selected by the search condition selection region 0621, from the search condition information table 0540 and the search equation information table 0550. More specifically, the record having the selected search condition name as the search condition name 0541 or the search condition name 0551 is deleted. Furthermore, when the administrator presses the addition button 0638, the rearranging rule subprogram 0410 adds a new record to the search equation information table 0550. Moreover, when the administrator presses the delete button 0639, the rearranging rule subprogram 0410 deletes a record concerning the search equation selected by the search equation setting region 0634, from the search equation information table.

(3) Rearranging Destination Decision Subprogram

Lastly, explanation will be given on the rearranging destination decision subprogram 0420.

Firstly, explanation will be given on the logical volume selection screen 0650 and the logical volume rearrangement check screen 0660 displayed by this subprogram.

Figure 14:
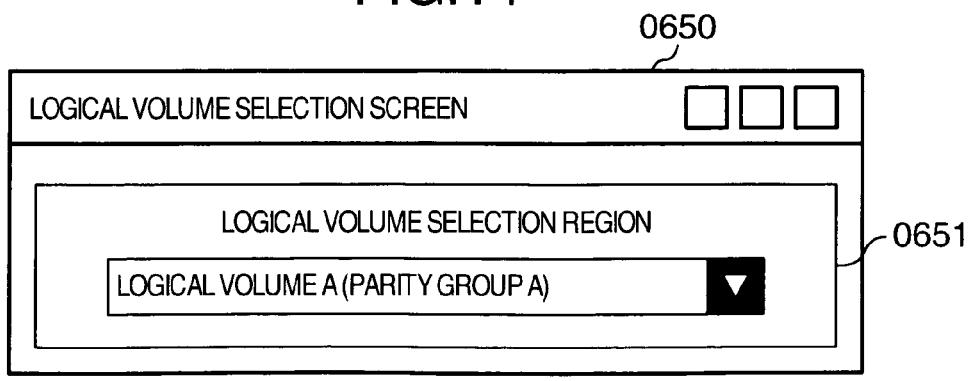
FIG. 14 shows an example of a logical volume selection screen in the present embodiment.

The logical volume selection screen 0650 is a screen for setting a logical volume to be moved. FIG. 14 shows the logical volume selection screen 0650 in this embodiment. This screen has a logical volume selection region 0651. The administrator can specify a logical volume to be rearranged by selecting a logical volume in this screen.

Figure 15:
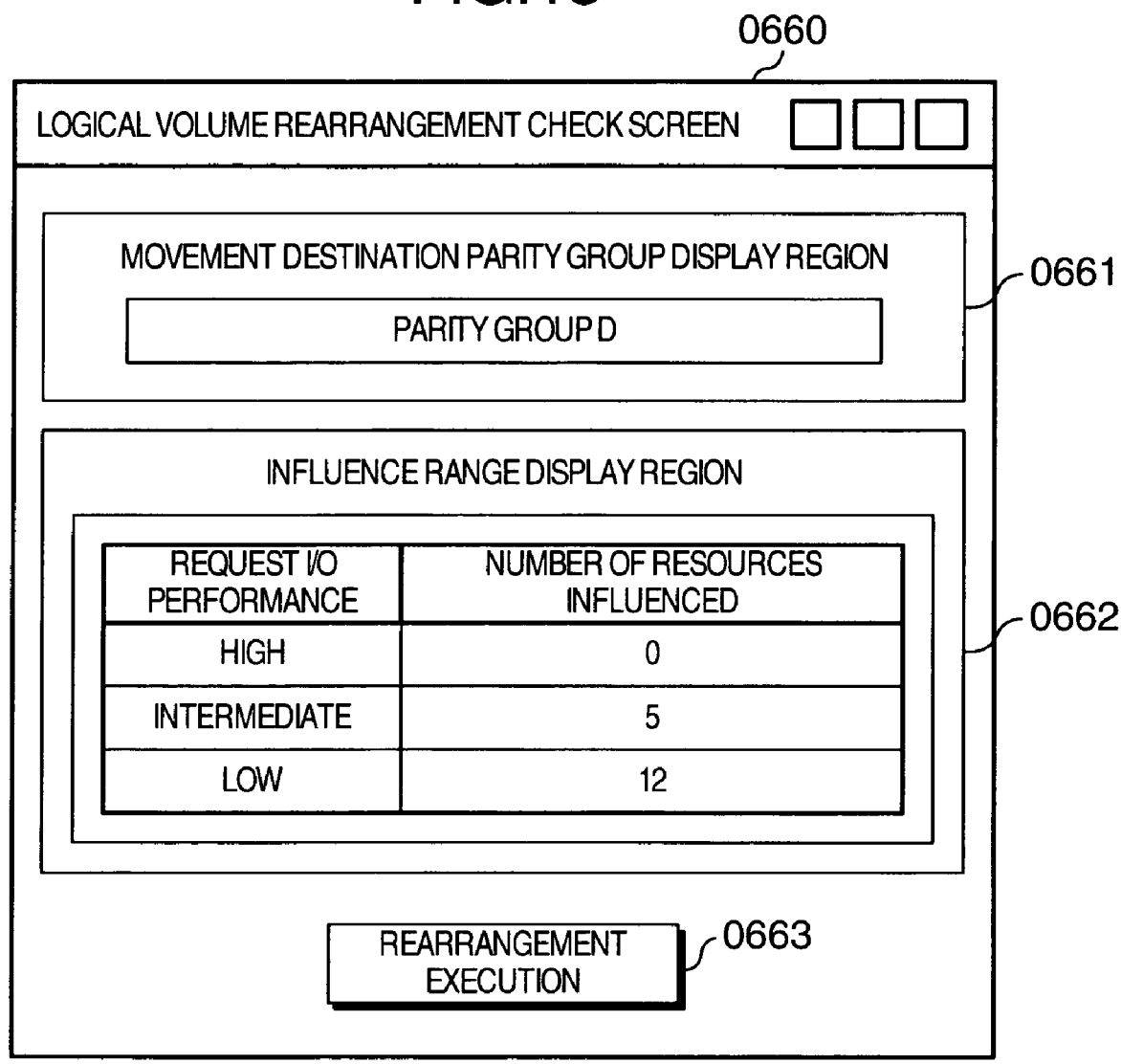
FIG. 15 shows an example of a logical volume rearrangement confirmation screen in the present embodiment.

The logical volume rearrangement check screen 0660 is a screen in which the logical volume specified by the logical volume selection screen 0650 displays the specified movement destination parity group. FIG. 15 shows the logical volume rearrangement check screen 0660 in this embodiment. As shown in FIG. 15, this screen consists of a movement destination parity group display region 0661, an influence range display region 0662, and a rearrangement execution button 0663.

The movement destination parity group display region 0661 is a region for displaying the movement destination parity group of the logical volume specified by the logical volume selection screen 0650.

The influence range display region 0662 is a region for displaying the number of volumes influenced by the I/O performance when the logical volume specified by the logical volume selection screen 0650 is moved to the parity group indicated by the movement destination parity group display region 0661.

The rearranging execution button 0663 is a button for executing the rearrangement according to the content displayed in the logical volume rearrangement check screen 0660.

Next, the rearranging destination decision subprogram 0420 will be detailed.

The rearranging destination decision subprogram 0420 displays all the logical volumes 0522 in the logical volume performance information table 0520, in the logical volume selection region 0651.

Furthermore, this subprogram decides the movement destination parity group and displays the parity group in the movement destination parity group display region 0661. Hereinafter, an explanation will be given regarding the movement destination parity group.

Figure 16:
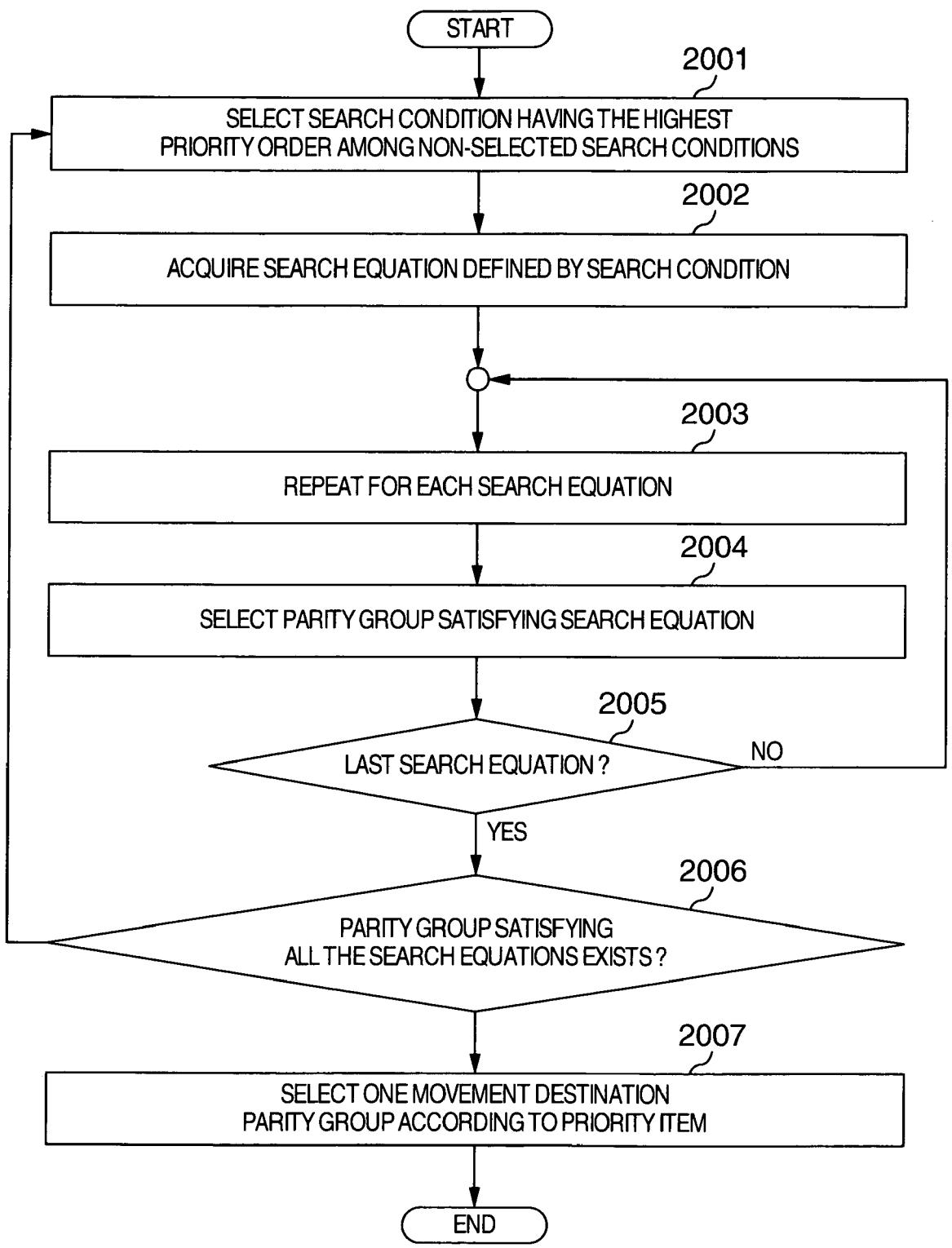
FIG. 16 shows an example of a flowchart for selecting a movement destination parity group in the present embodiment.

FIG. 16 is a processing flow for deciding the movement destination parity group by the subprogram in this embodiment.

In step 2001, among non-selected search conditions, the search condition having the highest priority order is selected. More specifically, from the search condition information table 0540, the search condition name 0541, the priority item 0543, and the search option 0544 having the highest priority order are acquired by using the priority order 0542 as the key.

Step 2002 acquires a search equation contained in the search condition. More specifically, all the records having the search condition acquired in the preceding step as the search condition name 0551 are searched.

Step 2003 performs initialization for performing repeated processing in all the condition equations acquired by step 2002.

Step 2004 selects a parity group satisfying the search equation. Details will be given later.

Step 2005 checks whether the search equation is the last search equation acquired in step 2002. If the search equation is the last one, control is passed to step 2006. Otherwise, control is returned to step 2003.

Step 2006 checks whether a parity group satisfying all the search equations acquired in step 2002 exists. Moreover, this step checks whether the logical volume can be moved to the aforementioned parity group, via the micro program 0152. If no parity group satisfying the aforementioned condition exists, control is returned to step 2001. If a parity group satisfying the aforementioned condition exists, control is passed to step 2007.

Step 2007 acquires one parity group according to the priority item acquired in step 2001 if a plurality of parity groups satisfying step 2006 exist. If the priority item is "parity group performance", the parity group having the least use ratio is acquired. More specifically, the use ratio of each parity group is acquired by referencing the use ratio 0523 of the parity group performance information table 0520 and the parity group having the smallest use ratio is selected.

Moreover, when the priority item is "the number of I/O performance deterioration resources", "the number of I/O performance deterioration resources (request I/O performance: high)", "the number of I/O performance deterioration resources (request I/O performance: intermediate)", or "the number of I/O performance deterioration resources (request I/O performance: low)", the number of volumes that connects to the parity group in accordance with the request I/O performance is acquired for each parity group and the parity group having smallest item specified is acquired. More specifically, the volume connected to each parity group is acquired from the server/storage mapping table 0500. The aforementioned information can be acquired by searching the volume 0502 by using the connection destination parity group 0505 as the key. Next, the request I/O performance of each volume is acquired from the request I/O performance setting information table 0530. More specifically, this information can be acquired by acquiring the request I/O performance 0533 by using the resource 0532 as the key. By combining this information, it is possible to acquire the number of volumes that connects to the parity group in accordance with the request I/O performance for each parity group.

Figure 17:
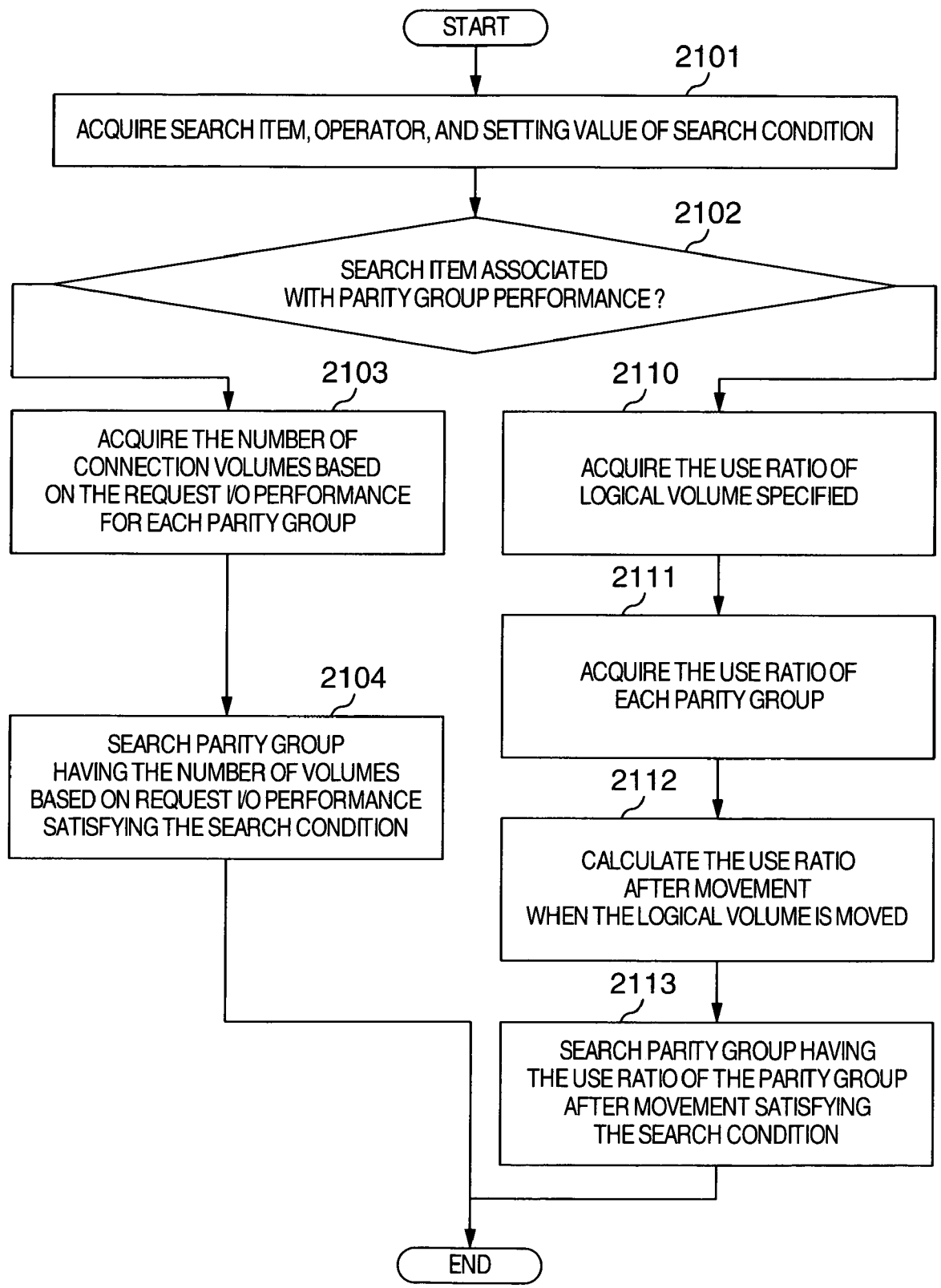
FIG. 17 shows an example of a flowchart for acquiring a parity group satisfying the search condition in the present embodiment.

Next, an explanation will be given regarding the flow (step 2004) for searching the parity group satisfying the search equation. FIG. 17 is a processing flow for searching the parity group satisfying the search equation in this embodiment.

Step 2101 acquires the search item 0552, the operator 0553, and the setting value 0554 of the search condition from the search equation information table 0550.

If the search item is "the parity group performance" in step 2102, control is passed to step 2103. Otherwise, control is passed to step 2110.

Step 2103 acquires the number of volumes that connects to the parity group in accordance with the request I/O performance for each parity group by the method indicated by step 2007.

Step 2104 searches a parity group in which the number of volumes for each request I/O performance calculated by step 2103 satisfies the search condition.

Step 2110 acquires the use ratio of the logical volume specified. More specifically, this step searches the use ratio 0523 of the record having, as the logical volume 0522, the logical volume specified by the parity group performance information table 0520.

Step 2111 acquires the use ratio of each parity group by the method indicated by step 2007.

Step 2112 calculates the use ratio after the movement for each parity group when the logical volume is moved. More specifically, the use ratio of each parity group is acquired from the parity group performance information table 0520. Next, the use ratio of the parity group is added by the use ratio of the logical volume selected to obtain the use ratio after the movement.

Step 2113 searches a parity group in which the use ratio of the parity group after the movement calculated by step 2112 satisfies the condition specified by the operator and setting value obtained by step 2101.

It should be noted that in step 2104 and step 2113, the parity group to be searched is limited to the storage subsystem 0110 containing a logical volume to be moved, and accordingly, the movement destination parity group can be searched in the storage subsystem 0110 containing the logical volume, i.e., it is possible to balance the I/O load in the case of the storage subsystem 0110. Moreover, when the aforementioned limit is not applied, it is possible to search the movement destination parity group when moving the logical volume between the storage subsystem 0110, i.e., it is possible to balance the I/O load between a plurality of storage subsystems 0110.

Moreover, the rearranging destination decision subprogram 0420 displays the number of volumes influenced by the I/O performance in the influence range display region 0622. More specifically, calculation can be performed by acquiring the number of volumes for each request I/O performance using the aforementioned parity group by the method indicated in step 2007. Moreover, in this region, it is also possible to display a list of volumes influenced by the I/O performance in addition to the number of volumes. Thus, the subprogram displays the list of volumes and the administrator can know the list of volumes actually influenced by the I/O performance.

Furthermore, when the rearrangement execution button 0663 is pressed, the subprogram 0420 executes rearrangement according to the content displayed on the logical volume rearrangement check screen 0660 via the micro program 0152.

Description will now be directed to a second embodiment of the present invention. Here, an explanation will be given regarding the embodiment for executing rearrangement of the logical volume according to the request I/O performance and the rearranging rule set for the application. The second embodiment differs from the first embodiment in that the request I/O performance is not set in a server volume but in the application. Accordingly, hereinafter, only the difference from the first embodiment will be explained. Unless otherwise described, the data structure and the processing flow are identical to those of the first embodiment.

Figure 18:
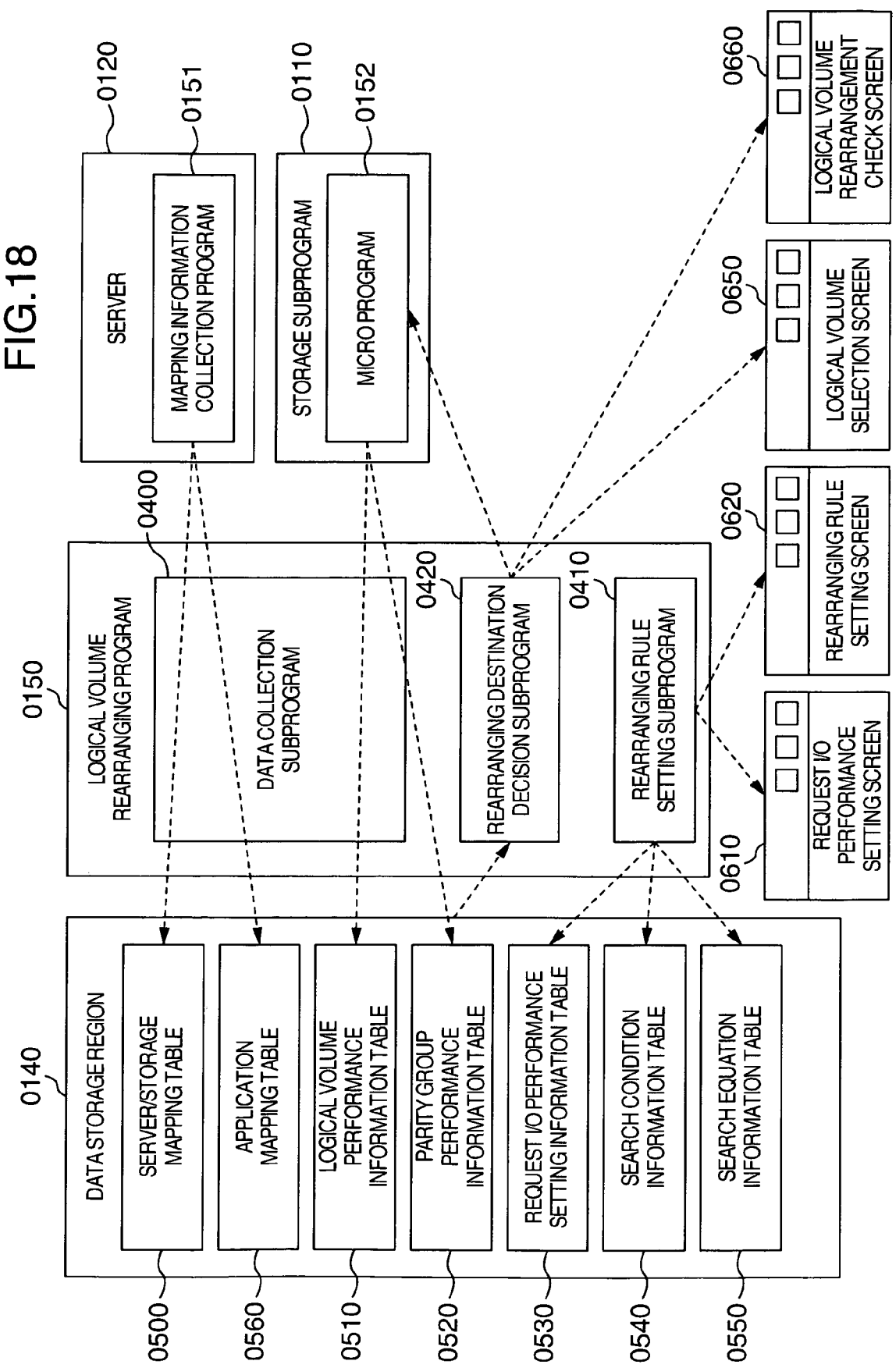
FIG. 18 shows an example of relationship between a data storage region, a logical volume rearranging program, a server, a storage subsystem, and each screen in the second embodiment.

Firstly, FIG. 18 shows the configuration diagram of the second embodiment.

The mapping information collection program 0151 executes, in addition to the processing explained in the first embodiment, the acquiring of the volume list information used by each application, by using the API provided by each application. It should be noted that the administrator can define in advance the aforementioned information by the format such as the CSV. The mapping information collection program 0151 acquires the volume list used by the application, by referencing the aforementioned definition information.

Moreover, the data collection subprogram 0400 executes, in addition to the processing explained in the first embodiment, the acquiring of the volume list used by the application from the mapping information collection program 0151 and storing of it in the application mapping table 0560. FIG. 19 shows the application mapping table 0560 in this embodiment. This table has an application name, a server name operated by the application, and a volume name used by the application in the columns of the application 0561, the server 0562, and the volume 0563.

The data collection subprogram 0400 acquires a volume list used by each application from the mapping information collection program 0151 and stores the application name, the server name operated by the application, and the volume name used by the application in the application 0561, the server 0562, and the volume 0563 in the application mapping table 0560.

The request I/O performance setting screen 0610 in the second embodiment is a screen for setting the request I/O performance for each application. The rearranging rule setting subprogram 0410 displays a list of applications according to the information on the application mapping table 0560 in the resource selection region 0611. Moreover, the aforementioned subprogram stores the application specified by the resource selection region 0611 in the resource 0532 of the request I/O performance setting information table 0530.

In the rearranging rule setting screen 0620 of the second embodiment, it is possible to specify the number of applications having I/O performance influenced by the logical volume rearrangement, by the search equation. It should be noted that in the second embodiment, the number of applications whose I/O performance is deteriorated by the logical volume rearrangement is referred to as "the number of I/O performance deterioration resources." The number of applications whose I/O performance is deteriorated by the logical volume rearrangement with a high request I/O performance is referred to as "the number of I/O performance deterioration resources (request I/O performance: high)". The number of applications whose I/O performance is deteriorated by the logical volume rearrangement with an intermediate request I/O performance is referred to as "the number of I/O performance deterioration resources (request I/O performance: intermediate)". The number of applications whose I/O performance is deteriorated by the logical volume rearrangement with a low request I/O performance is referred to as "the number of I/O performance deterioration resources (request I/O performance: low)".

Instead of calculating the number of volumes having I/O performance influenced by the logical volume rearrangement, the rearranging destination decision subprogram 0420 in the second embodiment calculates the number of applications influenced by I/O performance according to the following procedure. Firstly, rearranging destination decision subprogram 0420 searches the list of volumes influenced by the I/O performance by the method explained in the first embodiment. Next, the aforementioned subprogram searches the list of applications using the aforementioned volumes. More specifically, calculation can be executed by acquiring the applications having the aforementioned volumes in the volume 0563 from the application mapping table 0560.

Moreover, the rearranging destination decision subprogram 0420 displays the number of applications influenced by the I/O performance acquired by the method and the list of applications in the influence range display region 0662.

Thus, according to the present invention, even in the complicated structure that an application uses a plurality of parity groups, the administrator need not be conscious of the relationship between the application and the parity group for rearranging the logical volume without influencing the I/O performance of a particular application.

According to the logical volume rearranging method of the present invention, logical volume rearrangement is performed according to the request I/O performance of each application, performance information on each parity group, and the logical volume rearranging rule. Consequently, it is possible to easily perform logical volume rearrangement while considering the influence to the I/O performance of the other applications.

It should be further understood by those skilled in the art that although the foregoing description has been made regarding embodiments of the invention, the invention is not limited thereto, and various changes and modifications may be made without departing from the spirit of the invention and the scope of the appended claims.

What is claimed is:

1. A logical volume rearranging method used in a storage network environment including at least one storage subsystem and at least one server, said storage subsystem including means for transferring a logical volume in said storage subsystem to a parity group in said storage subsystem or to a parity group in a different storage subsystem and means for acquiring performance information of said logical volume and said storage subsystem, said method comprising the steps of:
    (a) collecting, from respective volume in each of said at least one server, mapping information of a storage subsystem connected with each volume, a parity group connected with each volume, and the logical volume connected with each volume, and collecting said performance information of respective parity groups and respective logical volumes;
    (b) setting a request I/O performance for said respective volumes in said server;
    (c) setting a rule for determining a logical volume rearranging destination;
    (d) when the logical volume to be rearranged is indicated, determining the parity group in said storage subsystem belonging to said logical volume as a rearranging destination in accordance with the information acquired by steps (a), (b) and (c); and
    (e) transferring said logical volume to the parity group determined by step (d).

2. The method as claimed in claim 1, wherein said parity group in said different storage subsystem is also designated as a rearranging destination in step (d).

3. The method as claimed in claim 1,
    wherein said rule for determining the logical volume rearranging destination includes a plurality of search conditions, each of said search conditions including a plurality of search equations, priority items and priority orders, wherein a parity group performance value and a number of volumes having a specifically requested I/O performance are specified, said parity group performance value being parameters and said priority items in said search equations when said logical volume is transferred to the rearranging destination, and said number of volumes having the specifically requested I/O performance being of the volumes deteriorating the I/O performance when the logical volume is transferred to said parity group;

wherein step (d) further includes checking whether a parity group satisfying all the search equations included in said search conditions exists in accordance with a descending priority of respective search conditions; and wherein the parity group having a lowest value of said priority items included in said search conditions, among said parity groups satisfying said search conditions is selected as the parity group to be the rearranging destination.

4. The method as claimed in claim 3, wherein step (d) further comprises:
(d1) calculating a volume having said specifically requested I/O performance among the volumes for using the respective parity groups, by using information relating to a corresponding relationship between the parity group acquired by said step (a) and the volume to be used by said acquired parity group and information of said requested I/O performance of the respective volumes acquired by said step (b); and
(d2) defining said volume as a volume, the I/O performance of which is deteriorated, indicated by said specifically requested I/O performance when the logical volume is rearranged to said parity group.

5. The method as claimed in claim 3, wherein step (d) further comprises:
(d3) acquiring a performance value of the logical volume to be rearranged and a performance value of the parity to be said rearranging destination from the information acquired by step (a); and
(d4) defining a value, obtained by adding said performance value of said parity group to said performance value of the logical volume, as a performance value of the parity group after rearrangement.

6. The method as claimed in claim 3, further comprising the steps of:
(f) setting application configuration information having a volume list used by applications;
(g) setting said requested I/O performance for every application at said step (b); and
(h) indicating a number of the applications, the I/O performance of which is deteriorated, when rearrangement of the logical volume is performed for the applications having said specifically requested I/O performance with use of said parameters and said priority items in said search equation.

7. The method as claimed in claim 6, wherein step (d) further comprises:
(d5) calculating application information using said respective parity groups by using said information relating to a corresponding relationship between said parity group acquired by step (a) and the volume for using said acquired parity group, and information relating to a corresponding relationship between the applications acquired by step (f) and the volume for using said applications;
(d6) calculating an application for each requested I/O performance for using said respective parity groups, by using said calculated application information and the requested I/O performance for said respective applications set by step (b); and
(d7) defining said application as an application, the I/O performance of which is deteriorated, indicated by said specifically requested I/O performance when the logical volume is transferred to said parity group.

8. The method as claimed in claim 3, wherein the volume or a list of the applications, the I/O performance of which is deteriorated by the rearrangement of the logical volume, is displayed.

9. The method as claimed in claim 3, wherein the number of the volumes or number of applications for each requested I/O performance, which is deteriorated by the rearrangement of the logical volume, is displayed.

10. A logical volume rearranging system used in a storage network environment including at least one storage subsystem and at least one server, said storage subsystem including means for transferring a logical volume in said storage subsystem to a parity group in said storage subsystem or to a parity group in a different storage subsystem and means for acquiring performance information of said logical volume and said storage subsystem, the system comprising:
means for collecting mapping information, from respective volumes in each of said at least one server, of a storage subsystem connected with each volume, a parity group connected with each volume, and a logical volume connected with each volume, and for collecting said performance information of respective parity groups and respective logical volumes;
means for setting a requested I/O performance for said respective volumes in said server;
means for setting a rule for determining a logical volume rearranging destination;
means for determining the parity group in said storage subsystem belonging to said logical volume as a rearranging destination when the logical volume to be rearranged is indicated; and
means for transferring said logical volume to said parity group.

11. The system as claimed in claim 10, wherein said parity group in said different storage subsystem is also designated as a rearranging destination.

12. The system as claimed in claim 10,
wherein said rule for determining the logical volume rearranging destination includes a plurality of search conditions, said search conditions including a plurality of search equations, priority items, and priority orders;
wherein a parity group performance value and a number of volumes having specifically requested I/O performance are specified, said parity group performance value being parameters and said priority items in said search equation when said logical volume is transferred to the rearranging destination, and said number of volumes having the specifically requested I/O performance being of the volumes deteriorating the I/O performance when the logical volume is transferred to said parity group; and
wherein the means for determining the parity group further includes checking whether a parity group satisfying all the search equations included in said search conditions exists in accordance with a descending priority of respective search conditions in said means for determining said parity group, and the parity group having a lowest value of said priority items included in said search conditions, among said priority groups satisfying said search conditions, is selected as a parity group to be the rearranging destination.

13. The system as claimed in claim 12, wherein said means for determining the parity group calculates a volume having said specifically requested I/O performance among the volumes for using the respective parity groups by information relating to a corresponding relationship between the parity group and the volume to be used said parity group and information of said requested I/O performance of the respective volumes, and defines said volume as a volume, the I/O performance of which is deteriorated, indicated by said specifically requested I/O performance when the logical volume is rearranged to said parity group.

14. The system as claimed in claim 12, said means for determining the parity group acquires a performance value of the logical volume to be rearranged and a performance value of the parity group to be said rearranging destination from said information acquired by said means for collecting, and defines a value, obtained by adding said performance value of said parity group to said performance value of the logical volume, as a performance value of the parity group after rearrangement.

15. The system as claimed in claim 12, further comprising means for setting application configuration information for a volume list to be used by applications,
   wherein said requested I/O performance for every application is set by said requested I/O performance setting means, and
   wherein a number of the applications, the I/O performance of which is deteriorated, is indicated when rearrangement of the logical volume is performed for the applications having said specifically requested I/O performance with use of said parameters and said priority items in said search equations.

16. The system as claimed in claim 15, wherein said means for determining the parity group calculates application information using said respective parity groups by using said information relating to a corresponding relationship between said parity group acquired by said means for collecting and the volume for using said acquired parity group, and information relating to a corresponding relationship between the means for setting application configuration information and the volume for using said applications;
   calculates an application for each requested I/O performance for using said respective parity groups, by using said calculated application information and the requested I/O performance for said respective applications set by said means for setting a requested I/O performance; and
   defines said application as an application, the I/O performance of which is deteriorated, indicated by said specifically requested I/O performance when the logical volume is transferred to said parity group.

17. The system as claimed in claim 12, wherein the volume or a list of the applications, the I/O performance of which is deteriorated by the rearrangement of the logical volume, is displayed.

18. The system as claimed in claim 12, wherein the number of volumes or number of applications for each request I/O performance, which is deteriorated by the rearrangement of the logical volume, is displayed.

* * * * *